United States Patent
Iwashita et al.

(10) Patent No.: US 10,525,971 B2
(45) Date of Patent: Jan. 7, 2020

(54) CONTROL DEVICE IN HYBRID VEHICLE

(71) Applicant: Honda Motor Co., Ltd., Tokyo (JP)

(72) Inventors: Hideaki Iwashita, Saitama (JP);
Naoyuki Mimatsu, Saitama (JP);
Kazuhiko Kitano, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 187 days.

(21) Appl. No.: 15/693,485

(22) Filed: Sep. 1, 2017

(65) Prior Publication Data

US 2018/0072309 A1 Mar. 15, 2018

(30) Foreign Application Priority Data

Sep. 13, 2016 (JP) ................................ 2016-178891

(51) Int. Cl.
| | |
|---|---|
| *B60W 10/06* | (2006.01) |
| *B60W 10/08* | (2006.01) |
| *B60W 10/113* | (2012.01) |
| *B60W 20/40* | (2016.01) |
| *B60K 6/26* | (2007.10) |

(Continued)

(52) U.S. Cl.
CPC ............... *B60W 20/40* (2013.01); *B60K 6/26* (2013.01); *B60K 6/48* (2013.01); *B60W 10/02* (2013.01);
(Continued)

(58) Field of Classification Search
CPC ....................... B60W 10/113; B60K 2006/268
See application file for complete search history.

(56) References Cited

U.S. PATENT DOCUMENTS

| | | | |
|---|---|---|---|
| 6,712,734 B1 * | 3/2004 | Loeffler ................... | B60K 6/40 477/5 |
| 8,366,584 B2 * | 2/2013 | Stefani ..................... | B60K 6/48 477/5 |

(Continued)

FOREIGN PATENT DOCUMENTS

| | | |
|---|---|---|
| CN | 102803038 | 11/2012 |
| CN | 102869557 | 1/2013 |

(Continued)

OTHER PUBLICATIONS

"Office Action of Japan Counterpart Application," dated May 29, 2018,with English translation thereof, p. 1-p. 7.
(Continued)

*Primary Examiner* — Sherry L Estremsky
(74) *Attorney, Agent, or Firm* — JCIPRNET

(57) ABSTRACT

A control device in a hybrid vehicle in which control is performed so that the hybrid vehicle can travel using only one shift mechanism from two shift mechanisms is provided. The control device in the hybrid vehicle includes: a transmission including: a first input shaft connected to a motor and optionally connected to an engine; a second input shaft optionally connected to the engine; an output shaft configured to output to power to drive wheels; a first shift mechanism including a plurality of shift gears optionally coupled to the first input shaft; and a second shift mechanism including a plurality of other shift gears optionally coupled to the second input shaft; and an electronic control unit (ECU), wherein the ECU starts the engine with the first input shaft using the motor if none of the shift gears in the first shift mechanism is engaged when the engine is not operating.

2 Claims, 5 Drawing Sheets

(51) Int. Cl.
  *B60K 6/48* (2007.10)
  *B60W 10/02* (2006.01)

(52) U.S. Cl.
  CPC ............ *B60W 10/06* (2013.01); *B60W 10/08* (2013.01); *B60W 10/113* (2013.01); *B60K 2006/268* (2013.01); *B60K 2006/4825* (2013.01); *B60W 2510/1005* (2013.01); *B60W 2710/021* (2013.01); *B60W 2710/1005* (2013.01); *B60Y 2200/92* (2013.01); *Y10S 903/93* (2013.01); *Y10S 903/945* (2013.01); *Y10S 903/946* (2013.01)

(56) References Cited

U.S. PATENT DOCUMENTS 9,017,214 B2 * 4/2015 Murakami ............... B60K 6/48
    477/5
9,022,897 B2 * 5/2015 Maass ................... B60W 10/02
    477/5
2015/0006000 A1 * 1/2015 Kawata ................... B60K 6/48
    701/22

FOREIGN PATENT DOCUMENTS

| CN | 103313891 | 9/2013 |
| CN | 103958311 | 7/2014 |
| JP | 2009-036354 | 2/2009 |
| JP | 2014-108011 | 6/2014 |
| JP | 2016-013732 | 1/2016 |

OTHER PUBLICATIONS

"Office Action of China Counterpart Application," with English translation thereof, issued Sep. 29, 2019, pp. 1-11.

* cited by examiner

CONTROL DEVICE IN HYBRID VEHICLE

CROSS-REFERENCE TO RELATED APPLICATION

This application claims the priority benefit of Japan Application no. 2016-178891, filed on Sep. 13, 2016. The entirety of the above-mentioned patent application is hereby incorporated by reference herein and made a part of this specification.

BACKGROUND OF THE INVENTION

Field of the Invention

The present invention relates to a control device in a hybrid vehicle which includes an internal combustion engine and an electric motor serving as power sources.

Description of Related Art

Hybrid type vehicles including, as power sources, electric motors (motors) in addition to internal combustion engines (engines) are well known. As one of transmissions used for the hybrid type vehicles as described above, there is a twin clutch type transmission including an odd stage clutch by which a first input shaft in a first shift mechanism constituted of shift stages of odd stages (1-, 3-, and 5-speed stages, and the like) can be connected to an internal combustion engine and an even stage clutch which can be connected to a second input shaft in a second shift mechanism constituted of shift stages of even stages (2-, 4-, and 6-speed stages, and the like), in which the two connection and disconnection mechanisms are switched between to perform shifting of a gear. Furthermore, as such a twin clutch type transmission, there is a transmission constituted such that a rotating shaft of an electric motor is coupled to a first input shaft in a first shift mechanism (for example, refer to Patent Document 1).

Here, it is also conceivable that one shift mechanism from a first shift mechanism and a second shift mechanism may not be able to be in an in-gear state in some cases in an unexpected situation in such a hybrid vehicle. In this case, even when one of the shift mechanisms can be in-gear normally, if appropriate control for the purpose of using the other shift mechanism cannot be performed, it is necessary for a control device to determine that the vehicle cannot travel, for example. For this reason, in the related art, a vehicle cannot travel when one of the shift mechanisms cannot be in an in-gear state.

PRIOR ART DOCUMENT

Patent Documents

[Patent Document 1] Japanese Unexamined Patent Application Publication No. 2016-013732

SUMMARY OF THE INVENTION

The present invention was made in view of the above-described circumstances, and an objective thereof is to provide a control device in a hybrid vehicle in which control is performed so that the hybrid vehicle can travel using only one shift mechanism from two shift mechanisms.

In order to solve the above-described problems, a control device (10) in a hybrid vehicle, includes: an internal combustion engine (2) and an electric motor (3) serving as power sources; a transmission (4) including: a first input shaft (IMS) connected to the electric motor (3) and optionally connected to the internal combustion engine (2) with a first power transfer element (C1); a second input shaft (SS) optionally connected to the internal combustion engine (2) with a second power transfer element (C2); an output shaft (CS) configured to output power to drive wheels (WL and WR); a first shift mechanism (G1) including a plurality of shift gears (50, 73, 75, and 77) optionally coupled to the first input shaft (IMS); and a second shift mechanism (G2) including a plurality of other shift gears (72, 74, and 76) optionally coupled to the second input shaft (SS); and a control unit (11) configured to control selection of a shift gear (50, 72, 73, 74, 75, 76, or 77) in the first shift mechanism (G1) and the second shift mechanism (G2), an operation of the first power transfer element (C1) and the second power transfer element (C2), and an operation of the internal combustion engine (2) and the electric motor (3), wherein the control unit (11) starts the internal combustion engine (2) with the first input shaft (IMS) using the electric motor (3) if a shift gear (50, 73, 75, or 77) in the first shift mechanism (G1) is not engaged when the internal combustion engine (2) is not operating.

If none of the shift gears (50, 73, 75, and 77) in the first shift mechanism (G1) is engaged when the internal combustion engine (2) is not operating as described above, the internal combustion engine (2) is started without requiring a driver to start the internal combustion engine (2) when control is performed to start the internal combustion engine (2) with the first input shaft (IMS) using the electric motor (3) when the control unit (11) detects that none of the shift gears (50, 73, 75, and 77) in the first shift mechanism (G1) is engaged. Here, since the power is transferred from the internal combustion engine (2) to the second shift mechanism (G2) when the second power transfer element (C2) is fastened, the vehicle can travel even when none of the shift gears in the first shift mechanism (G1) is engaged. Furthermore, the vehicle can travel if the power of the internal combustion engine (2) or the electric motor (3) is transferred to the first shift mechanism (G1) when none of the shift gears in the second shift mechanism (G2) is engaged. Thus, the vehicle can travel using only one shift mechanism from the two shift mechanisms.

Also, in the control device (10) in the hybrid vehicle, the control unit (11) may set the first shift mechanism (G1) to be in a state in which power is not transferred from the first input shaft (IMS) to the output shaft (CS) before the internal combustion engine (2) is started using the electric motor (3) if a shift gear (50, 73, 75, or 77) in the first shift mechanism (G1) is not engaged when the internal combustion engine (2) is not operating.

The first shift mechanism (G1) is set to a neutral state in which power from the first input shaft (IMS) to the output shaft (CS) is not transferred as described above before the internal combustion engine (2) is started using the electric motor (3) so that a power transfer from the first input shaft (IMS) to the output shaft (CS) before the internal combustion engine (2) is started can be prevented.

In the control device (10) in the hybrid vehicle, the control unit (11) may determine whether the power due to rotation when the first input shaft (IMS) is rotated using the electric motor (3) is transferred to the output shaft (CS) when the first shift mechanism (G1) is set to be in a state in which the power is not transferred from the first input shaft (IMS) to the output shaft (CS). When the first shift mechanism (G1) is set to be in the state in which power is not transferred from the first input shaft (IMS) to the output shaft (CS) as described above, once the first input shaft (IMS) is rotated using the electric motor (3) it is determined whether the power is transferred to the output shaft (CS) using such rotation. Here, when power is not transferred to the output shaft (CS), the first shift mechanism (G1) is reliably in an off-gear state from the first input shaft (IMS). For this reason, it is determined whether power is transferred to the output shaft (CS) so that a state in which power is not transferred from the first input shaft (IMS) to the output shaft (CS) can be reliably set before the internal combustion engine (2) is started.

In the control device (10) in the hybrid vehicle, the control unit (11) may operate the second power transfer element (C2) and transfer the power of the internal combustion engine (2) to the second input shaft (SS) after the internal combustion engine (2) is started using the electric motor (3). Thus, since the shift gear can be changed using the second shift mechanism (G2) coupled to the second input shaft (SS) even when none of the shift gears (50, 73, 75, and 77) in the first shift mechanism (G1) is engaged, the vehicle can travel.

Note that the above-described reference numerals in the parentheses are reference numerals of constituent elements in an embodiment which will be described below as examples of the present invention.

According to the control device in the hybrid vehicle according to the present invention, control can be performed so that the hybrid vehicle can travel using only one shift mechanism from two shift mechanisms.

DESCRIPTION OF THE EMBODIMENTS

Figure 1:
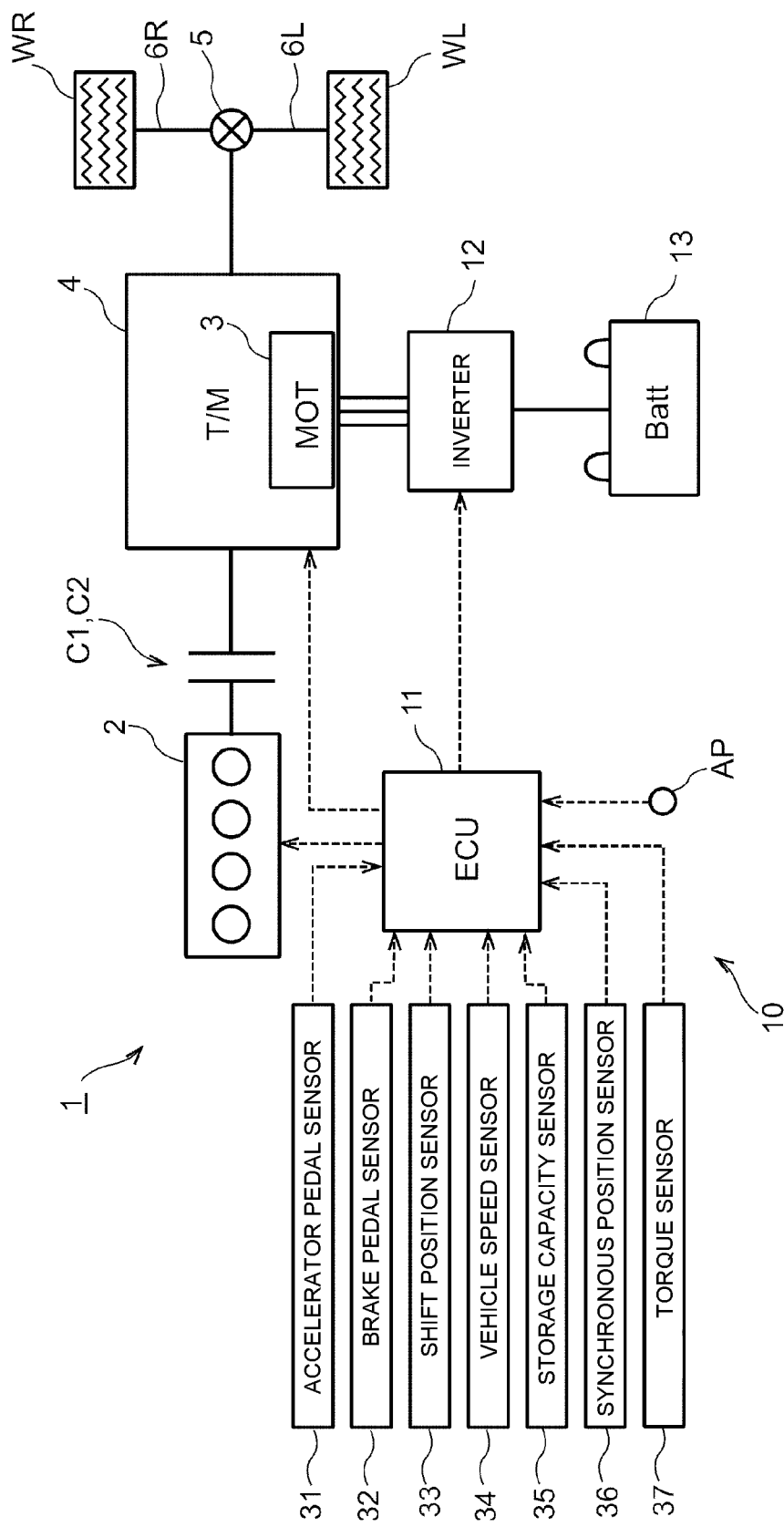
FIG. 1 is a schematic diagram illustrating a configuration example of a hybrid vehicle including a control device in a hybrid vehicle.

An embodiment of the present invention will be described in detail below with reference to the accompanying drawings. FIG. 1 is a schematic diagram illustrating a configuration example of a hybrid vehicle including a control device 10 in a hybrid vehicle according to this embodiment. As shown in FIG. 1, a vehicle 1 in this embodiment is a vehicle of a hybrid vehicle including an engine 2 (an internal combustion engine) and a motor 3 (an electric motor) serving as power sources.

The vehicle 1 further includes an inverter 12 configured to control the motor 3, a battery 13, a transmission 4, a differential mechanism 5, right and left drive shafts 6R and 6L, and right and left drive wheels WR and WL. Furthermore, the engine 2 may be a diesel engine, a turbo engine, or the like. Rotational driving forces in the engine 2 and the motor 3 are transferred to right and left drive wheels WR and WL via the transmission 4, the differential mechanism 5, and drive shafts 6R and 6L.

Also, the vehicle 1 includes the control device 10 including an electronic control unit (ECU) 11 serving as a control unit configured to control operations of the engine 2, the motor 3, the transmission 4, the differential mechanism 5, the inverter 12, and the battery 13.

The ECU 11 may be constituted as a single unit or may be constituted of, for example, a plurality of ECUs such as an engine ECU configured to control the engine 2, a motor generator ECU configured to control the motor 3 and the inverter 12, a battery ECU configured to control the battery 13, and an automatic transmission (AT)-ECU configured to control the transmission 4. The ECU 11 in this embodiment also issues a fuel supply command to the engine 2 as well as a command associated with an output to the motor 3 or the like in accordance with an operation of the accelerator pedal AP. Furthermore, the ECU 11 issues a command used to start the engine 2 using the motor 3 according to necessity even when an operation of the accelerator pedal AP is not being performed. Detailed description thereof will be provided below.

The engine 2 is an internal combustion engine configured to receive a command used to inject fuel in accordance with an operation of the accelerator pedal AP and to mix the fuel with air and combust the mixture to generate a driving force used to move the vehicle 1. The motor 3 generates a driving force used to move the vehicle 1 using electric energy of the battery 13 at the time of cooperative travel using the engine 2 and the motor 3 and independent travel using only the motor 3. Furthermore, the motor 3 functions as a generator configured to generate electric power using regeneration of the motor 3 when a speed of the vehicle 1 is reduced. The battery 13 is charged with the electric power (regenerative energy) generated by the motor 3 at the time of regeneration of the motor 3, and electric power is exchanged between the battery 13 and the motor 3.

Also, the ECU 11 receives input of various control signals of a plurality of control parameters. Examples of such control signals include a degree of accelerator pedal opening from an accelerator pedal sensor 31 configured to detect a stepping quantity on the accelerator pedal AP, a degree of brake pedal opening from a brake pedal sensor 32 configured to detect a stepping quantity on a brake pedal, a shift position from a shift position sensor 33 configured to detect a gear stage (a shift stage), a vehicle speed from a vehicle speed sensor 34 configured to detect a vehicle speed, a storage capacity from a storage capacity sensor 35 configured to measure a storage capacity (a state of charge: SOC) in the battery 13, positions of synchromesh mechanisms from a synchronous position sensor 36, a torque sensor 37 disposed at a rotating shaft and configured to measure electric power, and the like. The ECU 11 performs control on the basis of information from such sensors.

Figure 2:
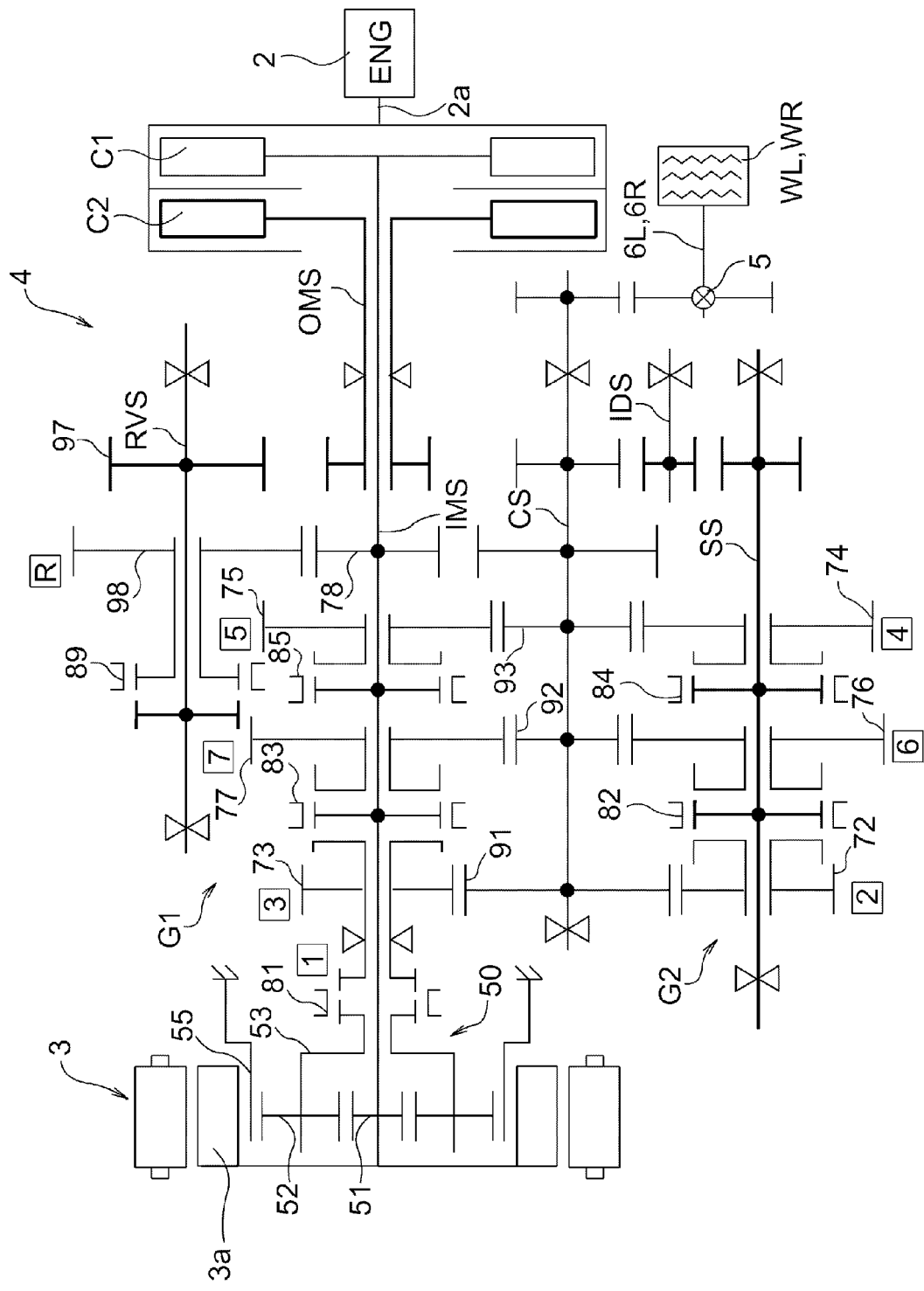
FIG. 2 is a skeleton diagram of a transmission shown in FIG. 1.

Next, a configuration of the transmission 4 included in the vehicle 1 in this embodiment will be described. FIG. 2 is a skeleton diagram of the transmission 4 shown in FIG. 1. The transmission 4 in this embodiment is a parallel shaft type transmission of a forward 7-speed and rearward 1-speed and a dry twin clutch type transmission (a dual clutch transmission: DCT).

The transmission 4 includes a first input shaft IMS optionally connected to an engine output shaft 2a in the engine 2 with a first clutch C1 (a first power transfer element), a second input shaft SS optionally connected to the engine output shaft 2a in the engine 2 with a second clutch C2 (a second power transfer element), and an output shaft CS connected to a first input shaft IMS and the second input shaft SS with a shift gear mechanism.

A gear of odd stages (1-, 3-, 5-, and 7-speeds) is arranged in the first input shaft IMS, and a gear of even stages (2-, 4-, and 6-speeds) is arranged in the second input shaft SS. The output shaft CS is connected to the differential mechanism 5 and generates a driving force which is a rotational output corresponding to the selected shift stage with respect to the drive wheels WR and WL.

Also, a planetary gear mechanism 50 is arranged on one end side of the first input shaft IMS. A rotor 3a in the motor 3 is connected to the first input shaft IMS, and the rotor 3a in the motor 3 is constituted to rotate around the planetary gear mechanism 50. With such a configuration, in the vehicle 1 including the engine 2 and the motor 3 used as power sources, the transmission 4 functions as a transmission for a hybrid vehicle.

An outer main shaft OMS is connected to an output side of the second clutch C2, and the outer main shaft OMS is disposed concentrically with the first input shaft IMS to form an outer cylinder of the first input shaft IMS. The outer main shaft OMS is engaged with a reverse shaft RVS and the second input shaft SS with an idle shaft IDS at all times, and a rotational output of the second clutch C2 is transferred to the reverse shaft RVS and the second input shaft SS. The shafts are parallel to each other.

A first shift mechanism G1 configured to realize a shift stage of odd stages will be described. A 3-speed driving gear 73, a 7-speed driving gear 77, and a 5-speed driving gear 75 are relatively rotatably disposed concentrically with respect to each other in the first input shaft IMS. A 3-7-speed synchromesh mechanism 83 is provided between the 3-speed driving gear 73 and the 7-speed driving gear 77 to be able to slide in an axial direction thereof, and a 5-speed synchromesh mechanism 85 is provided to correspond to the 5-speed driving gear 75 and to be able to slide in the axial direction thereof.

With such a configuration, when any of desired odd shift stage gears (the planetary gear mechanism 50, which is a 1-speed driving gear, the 3-speed driving gear 73, the 5-speed driving gear 75, and the 7-speed driving gear 77) is selected, one or more first synchronous engagement parts (the 1-speed synchromesh mechanism 81, the 3-7-speed synchromesh mechanism 83, and the 5-speed synchromesh mechanism 85) disposed in the first input shaft IMS are moved. Thus, the desired selected shift stage is coupled to the first input shaft IMS.

The driving gears in the first shift mechanism G1 are meshed with corresponding gears among output gears provided in the output shaft CS. To be specific, the 3-speed driving gear 73, the 7-speed driving gear 77, and the 5-speed driving gear 75 are meshed with a first output gear 91, a second output gear 92, and a third output gear 93, respectively. Meshing is performed as described above so that the output shaft CS is rotatably driven.

A second shift mechanism G2 configured to realize a shift stage of even stages will be described. A 2-speed driving gear 72, a 6-speed driving gear 76, and a 4-speed driving gear 74 are relatively rotatably disposed concentrically with each other in the second input shaft SS. A 2-6-speed synchromesh mechanism 82 is provided between the 2-speed driving gear 72 and the 6-speed driving gear 76 to be able to slide in the axial direction thereof, and a 4-speed synchromesh mechanism 84 is provided to correspond to the 4-speed driving gear 74 and to be able to slide in the axial direction thereof.

With such a configuration, when any of desired even shift stage gears (the 2-speed driving gear 72, the 4-speed driving gear 74, and the 6-speed driving gear 76) is selected, one or more second synchronous engagement parts (the 2-6-speed synchromesh mechanism 82 and the 4-speed synchromesh mechanism 84) disposed at the second input shaft SS is moved. Thus, the selected shift stage is coupled to the second input shaft SS.

Driving gears in the second shift mechanism G2 are meshed with corresponding gears among output gears provided in the output shaft CS. To be specific, the 2-speed driving gear 72, the 6-speed driving gear 76, and the 4-speed driving gear 74 are meshed with the first output gear 91, the second output gear 92, and the third output gear 93, respectively. Meshing is performed as described above so that the output shaft CS is rotatably driven.

The planetary gear mechanism 50 is disposed at one end of the first input shaft IMS which is adjacent to the motor 3. The planetary gear mechanism 50 includes a sun gear 51, a pinion gear 52, and a ring gear 55, and the sun gear 51 is fixed to the first input shaft IMS, and thus the first input shaft IMS and the motor 3 integrally rotate. The ring gear 55 is fixed to a case in the transmission 4 and is configured to generate a transmission output from a carrier 53 in the pinion gear 52.

The 1-speed synchromesh mechanism 81 is provided between the carrier 53 in the planetary gear mechanism 50 and the 3-speed driving gear 73 in the first input shaft IMS. The 1-speed synchromesh mechanism 81 is switched on in accordance with selection of the 1-speed gear stage so that the carrier 53 is connected to the 3-speed driving gear 73 in the first input shaft IMS. Thus, a rotational driving force of the carrier 53 rotatably drives the output shaft CS with the 3-speed driving gear 73 and the first output gear 91.

A reverse shift mechanism GR configured to realize a reverse stage will be described. A gear 97 engaging with the idle shaft IDS is fixed to the reverse shaft RVS. In addition, a reverse gear stage configured to optionally couple the reverse shaft RVS to the first input shaft IMS is provided at the reverse shaft RVS. The reverse gear stage is constituted of a reverse driving gear 98 provided relatively rotatably and concentrically with respect to the reverse shaft RVS, a reverse synchromesh mechanism 89 configured to optionally couple the reverse driving gear 98 to the reverse shaft RVS, and a gear 78 fixed to the first input shaft IMS to be meshed with the reverse driving gear 98.

The reverse synchromesh mechanism 89 is able to slide in the axial direction of the reverse shaft RVS. The reverse shaft RVS is not engaged with the reverse driving gear 98 at the time of forward travel. On the other hand, the reverse shaft RVS is engaged with the reverse driving gear 98 at the time of rearward travel.

In a hybrid drive unit in this embodiment, if neither of the first shift mechanism G1 and the second shift mechanism G2 is engaged when travel is performed using only the motor 3 (electric vehicle (EV) travel) without using the engine 2, the engine 2 is driven using the motor 3. In other words, when such a situation occurs, travel with only the motor 3 is stopped and the engine 2 is driven such that control is performed to switch to moving using another of the first shift mechanism G1 or the second shift mechanism G2 which can be engaged. Next, detailed description thereof will be provided.

Figure 3:
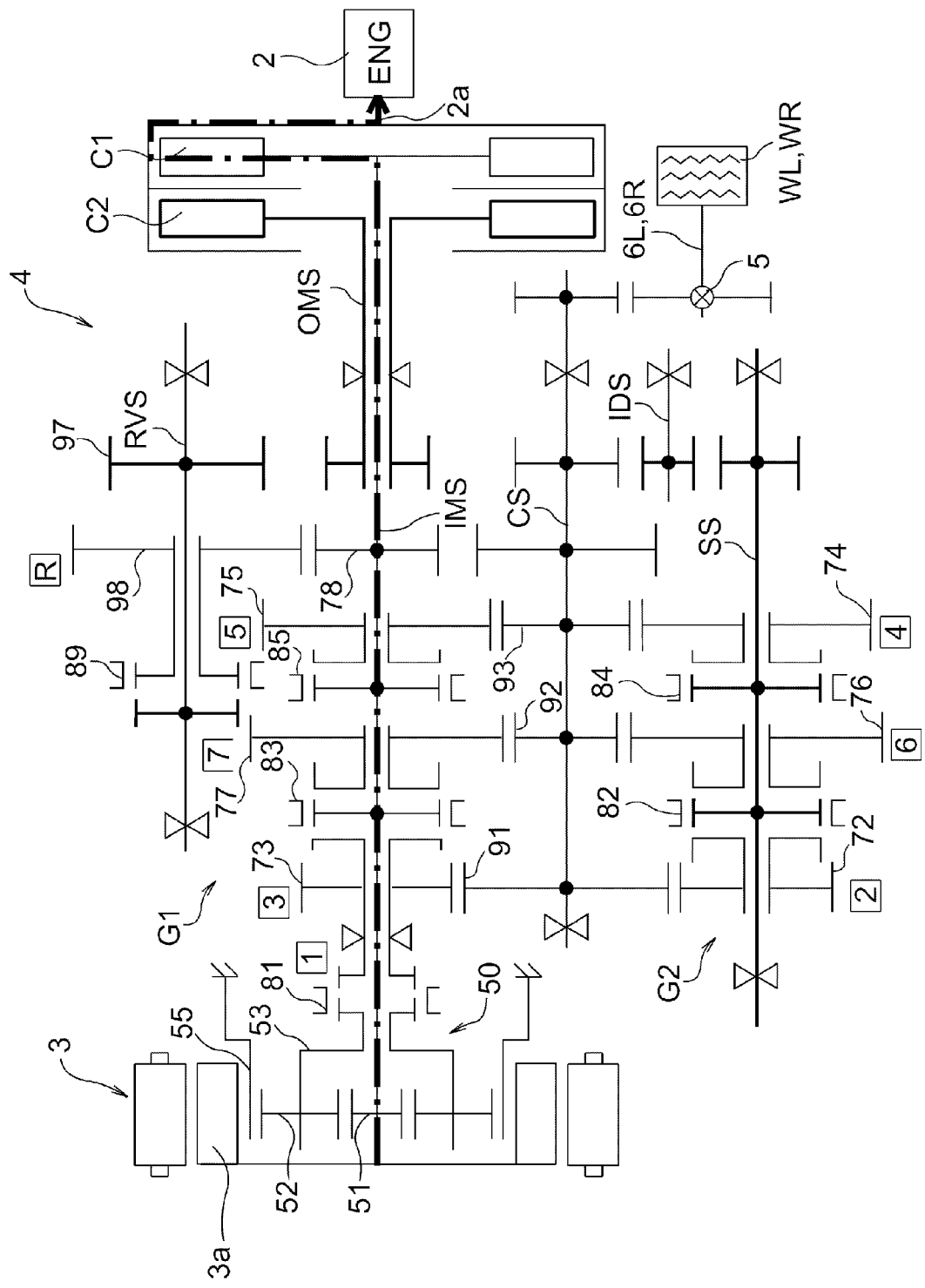
FIG. 3 is a skeleton diagram showing a power transfer path in a motor start mode.

A "motor start mode" serving as control in which the engine 2 is started using the motor 3 when any shift gear in the first shift mechanism G1 is not engaged will be described using FIG. 3. FIG. 3 is a skeleton diagram showing a power transfer path in the motor start mode. Note that, in the motor start mode, an operation or a command of a driver are required.

When none of the shift gears of the first shift mechanism G1 is engaged (is in an in-gear state), the planetary gear mechanism 50, the 3-speed driving gear 73, the 5-speed driving gear 75, and the 7-speed driving gear 77 which are odd stage gears arranged in the first input shaft IMS are disengaged (are in an off-gear state). Note that, the 1-speed synchromesh mechanism 81, the 3-7-speed synchromesh mechanism 83, and the 5-speed synchromesh mechanism 85 which are synchronous mechanisms arranged in the first shift mechanism G1 are disengaged such that the odd stage gears are set to off-gear states. When none of the synchronous mechanisms in the first shift mechanism G1 is engaged in this way, the power due to rotation of the first input shaft IMS is not transferred to the output shaft CS.

Also, when the first clutch C1 is fastened in a state in which the odd stage gear is in the off-gear state, a driving force of the motor 3 is transferred to the engine output shaft 2a in the engine 2 with the first input shaft IMS as indicated by a dotted-dashed line in FIG. 3. Thus, the engine 2 is started.

Figure 4:
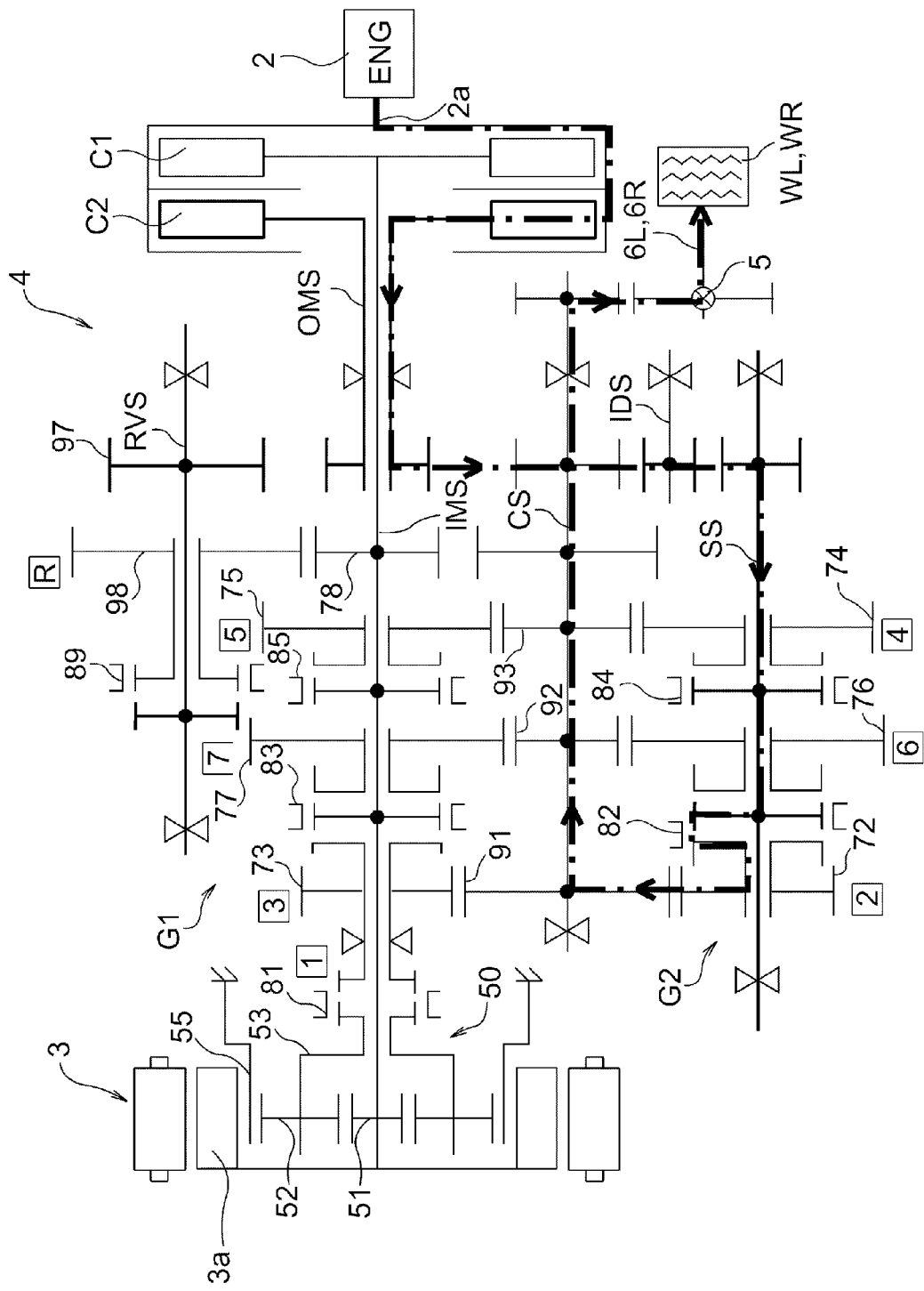
FIG. 4 is a skeleton diagram showing a power transfer path when a hybrid vehicle travels using a second shift mechanism through the power of an engine.

A state in which a shift gear in the second shift mechanism G2 is driven using the engine 2 after the engine 2 is started using the motor start mode will be described using FIG. 4. FIG. 4 is a skeleton diagram showing a power transfer path when a hybrid vehicle travels using the second shift mechanism G2 through the power of the engine 2. In FIG. 4, a state in which the 2-6-speed synchromesh mechanism 82 is synchronized and the 2-speed driving gear 72 is in an in-gear state in the second shift mechanism G2 is exemplified and described.

A synchronous sleeve in the 2-6-speed synchromesh mechanism 82 is moved toward the 2-speed driving gear 72 when the 2-speed driving gear 72 in the second shift mechanism G2 is driven using the engine 2. Thus, the 2-speed driving gear 72 is fastened. Moreover, when the second clutch C2 is fastened, the power from the engine 2 is transferred from the outer main shaft OMS to the second input shaft SS via the idle shaft IDS as indicated by a one-dot chain line in FIG. 4. Subsequently, the power is transferred to the 2-speed driving gear 72 via the 2-6-speed synchromesh mechanism 82, and is transferred to the first output gear 91 meshed with the 2-speed driving gear 72, and thereby is transferred to the output shaft CS. The power transferred to the output shaft CS is transferred to the drive wheels WR and WL via the differential mechanism 5.

Figure 5:
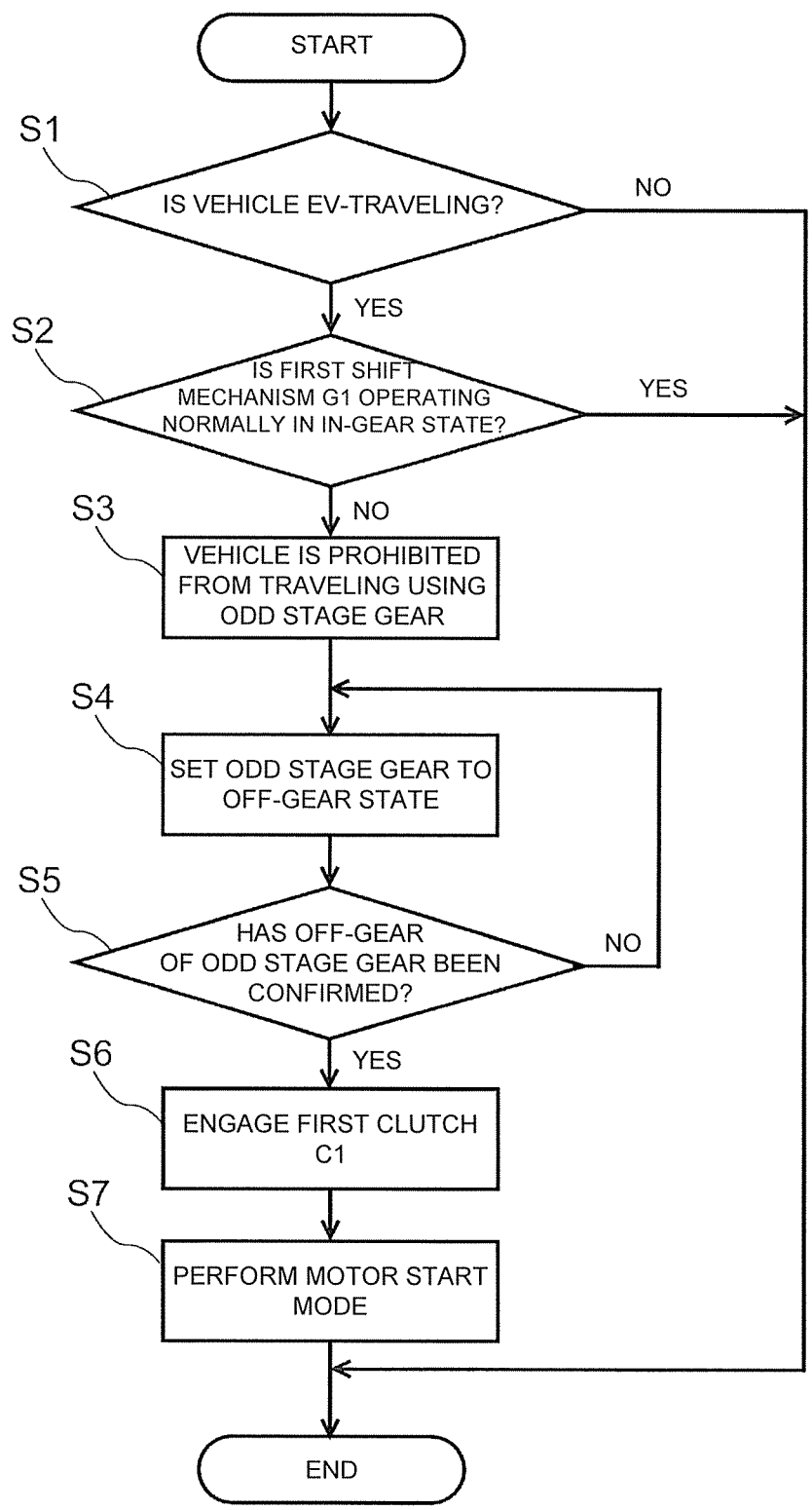
FIG. 5 is a flowchart for describing a procedure using the motor start mode.

A procedure in which the ECU 11 uses the motor start mode when none of the shift gears in the first shift mechanism G1 is engaged (is in the in-gear state) will be described using FIG. 5. FIG. 5 is a flowchart for describing the procedure using the motor start mode.

First, during traveling of the vehicle 1, it is determined whether the vehicle is traveling (EV-traveling) such that the motor 3 is operated (Step S1) when the engine 2 is not operating. Since the motor start mode need not be used when the vehicle is already traveling using the engine 2 in Step S1, control is then ended.

When it is determined that the vehicle is EV-traveling in Step S1, it is determined whether the first shift mechanism G1 is operating normally in an in-gear state (Step S2). Since the motor start mode need not be used when the first shift mechanism G1 is operating normally in the in-gear state, control is then ended. It may be determined whether the first shift mechanism G1 is operating normally in the in-gear state using information acquired from the synchronous position sensor 36.

When the first shift mechanism G1 is not operating normally in the in-gear state in Step S2, that is, when the first shift mechanism G1 is in a faulty in-gear state, the vehicle is prohibited from traveling using the odd stage gear (Step S3). For this reason, a command used to set the odd stage gear to an off-gear state (Step S4), that is, a command used to set an odd stage synchromesh mechanism to a neutral state is given. Thus, the first shift mechanism G1 can be set to be in a state in which no power is transferred from the first input shaft IMS to the output shaft CS.

Since all of the odd stage gears are reliably in off-gear states in accordance with a command in Step S4, an off-gear confirmation task is performed (Step S5). For example, it is determined whether the power due to rotation when the first input shaft IMS is rotated using the motor 3 is transferred to the output shaft CS. For example, the torque sensor 37 may be provided at the output shaft CS so that such determination is performed using the torque sensor. Alternatively, positions of odd stage synchromesh mechanisms in the first input shaft IMS may be determined using the synchronous position sensor 36 for off-gear confirmation of the odd stages.

When it is determined in Step S5 that the odd stage gear is reliably in an off-gear state, the first clutch C1 is fastened (Step S6) and a motor start mode in which the engine 2 is started using the motor 3 is performed (Step S7). Thus, the engine 2 is started regardless of an operation and a command of the driver.

Subsequently, after the first clutch C2 is opened, the second clutch C2 is operated and fastening is performed. Since power is transferred from the engine 2 to the second input shaft SS as described above when the second clutch C2 has been fastened, the vehicle 1 travels using the second shift mechanism G2.

As described above, according to the control device 10 in the hybrid vehicle in this embodiment, if none of the shift gears in the first shift mechanism G1 is engaged when the engine 2 is not operating, the engine 2 is controlled such it is started with the first input shaft IMS using the motor 3. Thus, when the ECU 11 detects that none of shift gears in the first shift mechanism G1 is engaged, the engine 2 is started without requiring the driver to start the engine 2.

Here, since power from the engine 2 is transferred to the second shift mechanism G2 when the second clutch C2 is fastened, the vehicle can travel even when none of shift gears in the first shift mechanism G1 is engaged. Note that, the vehicle can travel if power of the engine 2 or the motor 3 is transferred to the first shift mechanism G1 when no shift gears in the second shift mechanism G2 are engaged. Therefore, the vehicle can also travel using only one shift mechanism from two shift mechanisms.

Also, when the first shift mechanism G1 is set to be in a state in which power is not transferred from the first input shaft IMS to the output shaft CS before the engine 2 is started using the motor 3 in the control device 10 in the hybrid vehicle, power transfer from the first input shaft IMS to the output shaft CS before the engine 2 is started using the motor 3 can be prevented.

In the control device 10 in the hybrid vehicle, the ECU 11 may be characterized in that, when the first input shaft IMS is rotated using the motor 3, it is determined whether power is transferred to the output shaft CS using such rotation when the first shift mechanism G1 is set to be in a state in which power is not transferred from the first input shaft IMS to the output shaft CS. When the first shift mechanism G1 is set to be in the state in which the power is not transferred from the first input shaft IMS to the output shaft CS as described above, once the first input shaft IMS is rotated using the motor 3, it is determined whether power is transferred to the output shaft CS using such rotation. Here, when the power is not transferred to the output shaft CS, the first shift mechanism G1 is reliably in an off-gear state with respect to the first input shaft IMS. For this reason, it is determined whether power is transferred to the output shaft CS and thus a state in which power is not transferred from the first input shaft IMS to the output shaft CS can be more reliably set before the engine 2 is started using the motor 3.

In the control device 10 in the hybrid vehicle, the ECU 11 may be characterized in that, after the engine 2 is started using the motor 3, the second clutch C2 is operated and the power of the engine 2 is transferred to the second input shaft SS. Thus, since the shift gear can be changed using the second shift mechanism G2 coupled to the second input shaft SS even when none of the shift gears in the first shift mechanism G1 is engaged, the vehicle can travel.

Although the embodiment of the present invention has been described above, the present invention is not limited to the above-described embodiment, and various modifications can be performed without departing from the technical idea disclosed in the claims, the specification, and the drawings.

What is claimed is:

1. A control device in a hybrid vehicle, comprising:
   an internal combustion engine and an electric motor serving as power sources;
   a transmission including:
   a first input shaft connected to the electric motor and optionally connected to the internal combustion engine with a first power transfer element;
   a second input shaft optionally connected to the internal combustion engine with a second power transfer element;
   an output shaft configured to output power to drive wheels;
   a first shift mechanism including a plurality of shift gears optionally coupled to the first input shaft; and
   a second shift mechanism including a plurality of other shift gears optionally coupled to the second input shaft; and
   a control unit configured to control selection of a shift gear in the first shift mechanism and the second shift mechanism, an operation of the first power transfer element and the second power transfer element, and an operation of the internal combustion engine and the electric motor,
   wherein the control unit determines whether power due to rotation when the first input shaft is rotated using the electric motor is to be transferred from the first input shaft to the output shaft if a shift gear in the first shift mechanism is not engaged when the internal combustion engine is not operating, and
   after the control unit sets the first shift mechanism to be in a state in which power is not transferred from the first input shaft to the output shaft, the control unit starts the internal combustion engine using the electric motor.

2. The control device in the hybrid vehicle according to claim 1, wherein the control unit operates the second power transfer element and transfers the power of the internal combustion engine to the second input shaft after the internal combustion engine is started using the electric motor.

* * * * *